Nov. 2, 1926.
H. N. MOORE
1,605,455
STEERING WHEEL
Filed Jan. 25, 1926
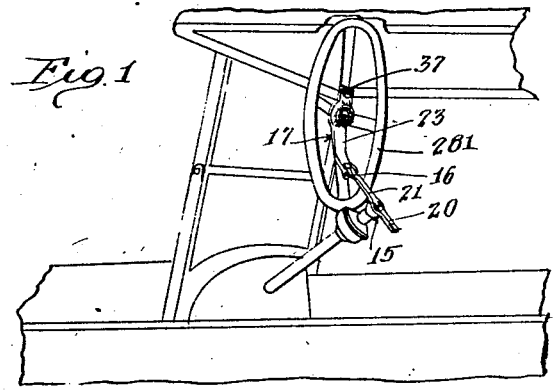
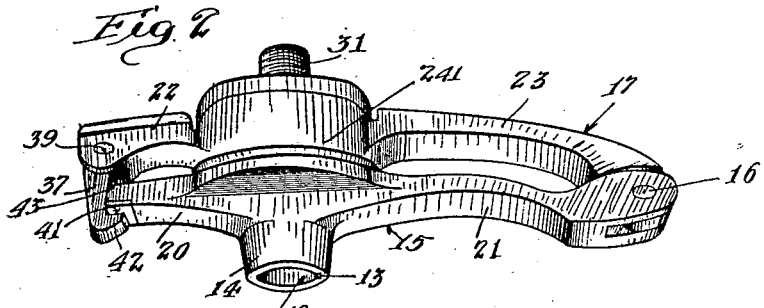
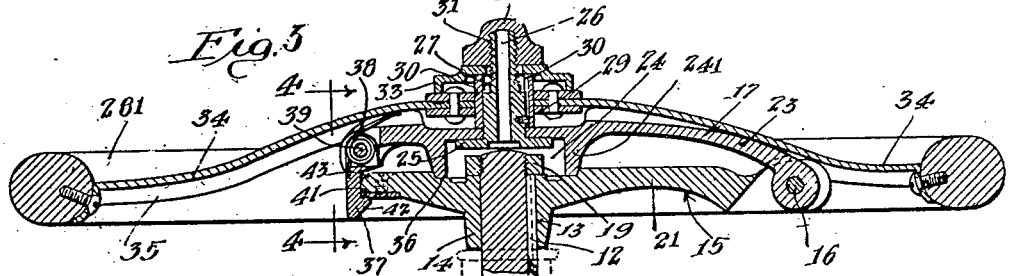
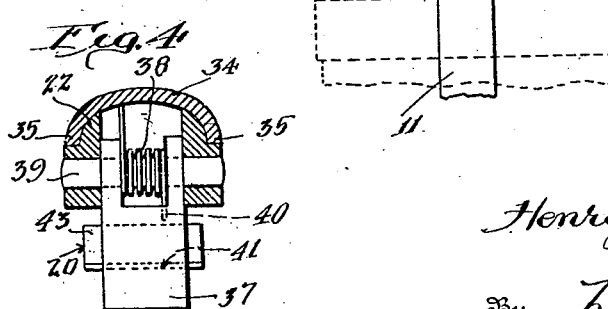
Inventor
Henry N. Moore
By Lyon & Lyon
Attorneys Patented Nov. 2, 1926.

BEST AVAILABLE COPY 1,605,455

UNITED STATES PATENT OFFICE.

HENRY N. MOORE, OF LOS ANGELES, CALIFORNIA, ASSIGNOR TO ROCKY MOUNTAIN STEEL PRODUCTS, INC., OF LOS ANGELES, CALIFORNIA, A CORPORATION OF CALIFORNIA.

STEERING WHEEL.

Application filed January 25, 1926. Serial No. 83,455.

This invention relates to steering gear constructions and more especially to that form of steering gear having a wheel that is movably connected with the shaft so that the driver of the automobile can displace the steering wheel, thus enabling him to enter the driver's seat with greater ease than is the case in automobiles not provided with displaceable steering wheels.
An important object of the invention is to provide a simple and cheap construction of this character that is applicable to dirigible vehicles and air and water craft and that is especially applicable to small, inexpensive automobiles now being manufactured and sold to such a large extent.

Another object and novel feature of this invention consists of the ability to convert a nontilting type of steering wheel into a tilting type by the attachment of this small and inexpensive device which can be done quickly and without change of the nontilting parts.

A feature of importance is embodied in the way the two main members fit into one another at the center, the upper member piloting itself into a shallow counterbore in the lower member and the lower edge of the upper member is held in contact with the bottom surface of counterbore in the lower member, relieving to quite an extent the strain on the hinge pin and preventing a rocking tendency of the attached steering wheel.
Another object is to make provision for utilizing all of the present steering wheel by providing an attachment having two hingedly connected members.

Another object is to make provision for hingedly connecting the steering wheel with the steering shaft by providing an attachment that can be secured in place without changing any part of the steering wheel.

Another object is to provide an attachment of this type that can be readily installed by simply removing the nut on the upper end of the steering shaft, taking off the steering wheel, substituting my attachment in place of the steering wheel by placing it on the shaft, securing the attachment to the shaft by screwing an ordinary nut on the shaft in place of the nut that has been removed, then placing the steering wheel on the attachment and, finally, placing the nut that has been removed from the steering shaft on a threaded stud that constitutes a portion of the attachment, thus holding the steering wheel and attachment assembled.

Another object is to provide a steering wheel spider attachment that will admit of tilting of the spider and rim of the wheel of the steering gear of an automobile or other vehicle or craft, an attachment that utilizes the rim and spider as furnished by the maker of the vehicle.

A further object is to provide an attachment of this character having a member fitting between the flanges of existing steering wheel spiders, the rim and spider requiring no machine work or change of any description and the attachment being capable of being installed in a few minutes with very little labor.

Figure 1 is a perspective view of a steering gear construction embodying the invention, the steering wheel being thrown out of its operative position so as to admit of ingress and egress of the driver of the vehicle. Fragments of the vehicle body and top are also shown.

Figure 2 is a perspective view of that portion of the steering gear construction embodying one form of the invention, as illustrated in Figure 1, the parts being shown in latched position, which is the position they occupy when the steering wheel is in position for use.

Figure 3 is a sectional elevation of the steering gear construction in Figure 1, the steering wheel being in its latched position.

Figure 4 is an enlarged sectional elevation on the line indicated by 4—4. Figure 3.

The steering shaft is indicated at 11 and is of the type found in certain well known types of automobiles, there being a key 12 in the shaft for engaging the keyway provided in the hub of the steering wheel that is provided for turning the steering shaft. In this instance, however, the steering wheel having been taken off, the key 12 engages a keyway 13 in the hub 14 of a member 15 which is hingedly connected at 16 to another member 17, the hub 14 having a bore 18 through which the shaft 11 projects. To hold the member 15 against being pulled off of the shaft 11, a nut 19 is screwed onto the shaft 11 above the upper face of the member 15. The member 15, in this instance, has a shorter arm 20 and a longer arm 21 and the member 17 is also provided with a shorter arm 22 and a longer arm 23. The hinge pin 16 connects the longer arms 21, 23.

The member 17 is provided with a hub 241 having a shouldered bore 24, the larger portion of said bore accommodating the nut 19 and the head 25 of a stud 26. The stud 26 projects through the bore 27 of the hub 28 of a steering wheel 281, and projecting laterally from the stud 26 is a shoulder 29 which lies in a keyway 30 in the hub 28. The stud 26 has a threaded portion 31 in which is screwed a cap nut 32. In this instance, there is a washer 33 between the nut 32 and the hub 28. The shoulder 29 and keyway 30 prevent turning of the stud while the nut 32 is being tightened or loosened.

The steering wheel 281 is of the usual type found on a small, inexpensive automobile now on the market, and the spider arms 34 are provided with spaced flanges 35 between which the arms 22, 23 seat, thus to prevent relative turning between the member 17 and the wheel 281 so that when the wheel is turned by the driver it will cause turning of the member 17.

The hub 241 projects into a recess 36 in the hub 14 of the member 15, and the wall of the recess is preferably tapered to fit the tapered outer wall of the hub 241 so that when the members 15, 17 are closed together the hub 241 will wedgedly engage the member 15, and this, together with the hinge connection between the members 15, 17, provides for transmitting turning movement of the member 17 to the member 15 to effect turning of the steering shaft 11 for steering the vehicle, in a manner well understood in this art. To hold the members 15, 17 in closed position with the hub 241 wedgedly engaging the member 15, there is provided a suitable latch 37 which is yieldingly held in latching position by a coil spring 38. In this instance, the latch 37 is pivoted at 39 to the arm 22 and the coil spring 38 surrounds the pivot 39 and has one end bearing against the arm 22 and the other end inserted in a hole 40 in the latch 37, the direction of winding of the spring being such as to tend to hold the latch 37 inwardly toward the arm 20 so that when the members 15, 17 are closed together, a shoulder 41 on the latch 37 will engage beneath the arm 20, as in Fig. 3. Preferably, the latch 37 has a beveled or sloping tip 42 and the end of the arm 20 a rounded portion 43 to permit of the arm 20 retracting the latch 37 when the member 17 is being moved from open position into closed position.

It will be readily understood that the shaft 11, steering wheel 281, and cap nut 32 are elements of a well known type of small automobile now on the market, and that, as said automobile is assembled in the factory, the key 12 engages the keyway 30, and the nut 32 is screwed onto the shaft 11 above said wheel to hold the wheel assembled on the shaft 11.

To install the invention on automobiles already equipped with a steering wheel, the following operations are performed: The nut 32 and the steering wheel will be removed thus exposing the upper end of the shaft 11 to view. The invention will then be installed by placing the member 15 over the upper end of the shaft 11 with the key 12 engaging the keyway 13. The member 17 being raised into open position, the nut 19 will be screwed onto the shaft 11. Then the stud 26 will be inserted in the hub 241 and the steering wheel will be applied over the stud so as to bring the arms 22, 23 into alignment with the interflange spaces of two of the arms of the steering wheel spider. The spider arm with which the arm 23 engages is preferably that one which is in front of the steering shaft when said shaft is in position to steer the vehicle straight ahead, thus insuring that when the steering wheel is thrown into its open position, as in Fig. 1, it will move upwardly and forwardly from the driver's seat.

The washer 33 will then be applied to the stud and the nut 32 screwed on to said stud.

The operation of the invention will be understood from the foregoing but may be briefly described as follows: Assuming that the member 17 is in the latched position shown in Fig. 3, the driver with his hand will pull the lower end of the latch 37 toward him so as to release it from the member 15, and at the same time he will grasp the lower portion of the steering wheel with his other hand and lift on the same so that, as soon as the latch 37 is disengaged, the steering wheel will be swung upwardly on its hinge pin 16 to the position shown in Fig. 1. The driver may with ease then get out of his seat. After the driver has returned to his seat, he may replace the steering wheel by pulling it down until the latch 37 engages beneath the member 15. The parts are then locked in position so that the wheel can be used for safely steering the automobile.

It will be seen from the foregoing that, when installing the invention on automobiles that have already been constructed, the entire old steering wheel, including the spider thereof, can be utilized.

I claim:—

A steering gear construction comprising a steering wheel having a hub and having arms with spaced flanges, a member having arms extending between the flanges, a second member hinged to the first member, latch means to releasably hold the first mentioned member against swinging away from the second member, means to detachably secure the second member to the upper end of a steering shaft, and means detachably securing the first mentioned member to the hub of the steering wheel.

Signed at Los Angeles, California, this 17 day of December 1925.

HENRY N. MOORE.